Aug. 23, 1966  A. H. HANSEN  3,268,190
MOUNTING BRACKET
Filed Jan. 22, 1965
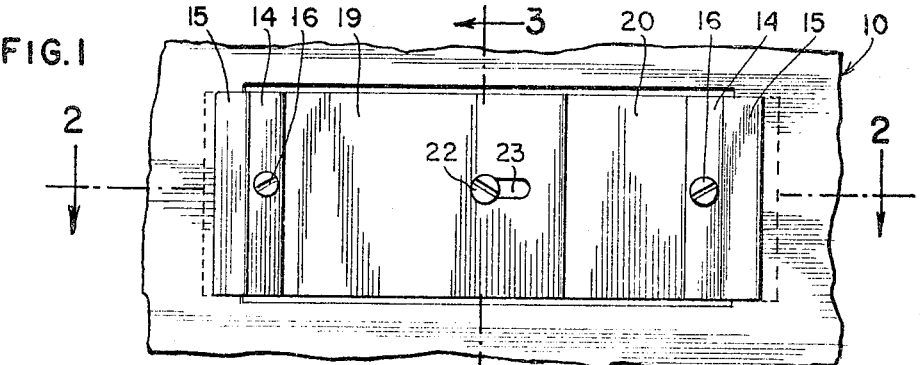
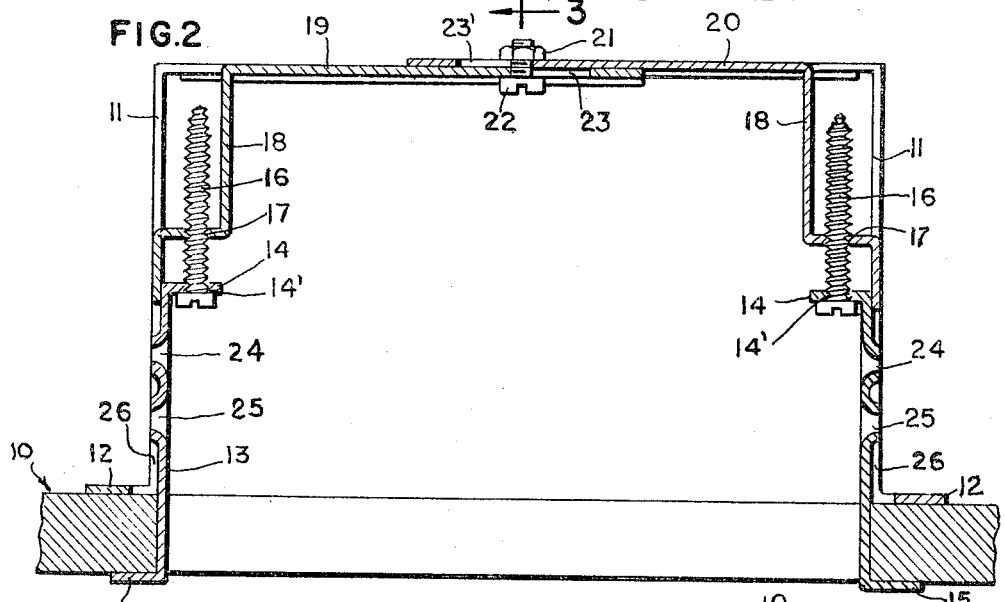
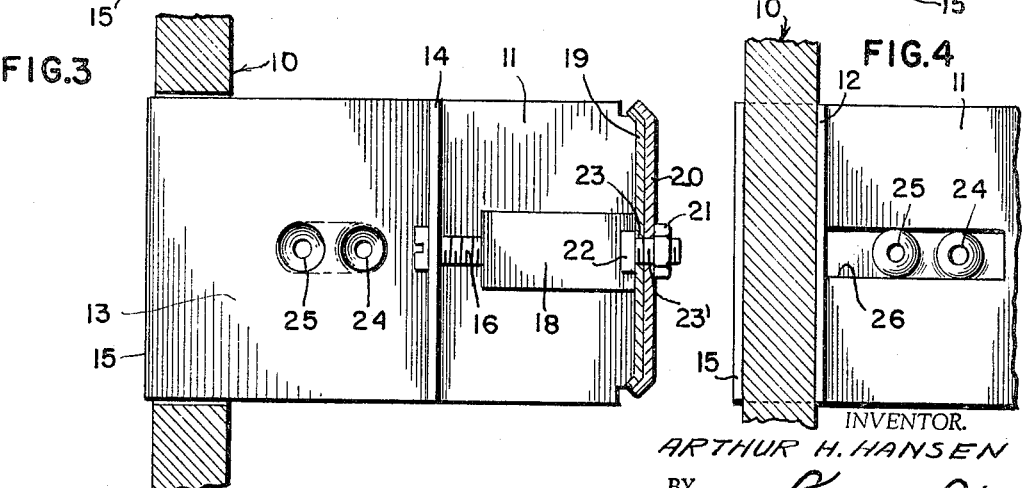
INVENTOR.
ARTHUR H. HANSEN
BY
Lyon & Lyon
ATTORNEYS United States Patent Office 3,268,190
Patented August 23, 1966

3,268,190
MOUNTING BRACKET
Arthur H. Hansen, San Marino, Calif., assignor to Hall-Mack Company, a Division of Textron, Inc., Los Angeles, Calif., a corporation of Rhode Island
Filed Jan. 22, 1965, Ser. No. 427,228
9 Claims. (Cl. 248—27)

This invention relates to a mounting bracket particularly adapted for mounting a fixture in the recess of a structural wall.

It is commonplace to install soap dishes, paper holders and the like within a recess in a structural wall. Many times the location in the wall at which it is desired to mount such fixtures is not adjacent to a suitable structural member, such as a two-by-four, to which the fixture may be securely attached. Accordingly, it is frequently necessary to provide a suitable mounting device within the recess before the fixture may be mounted. This invention is concerned with an improved mounting bracket useful for this and other purposes.

According to the present invention there is provided a bracket which is fully adjustable. This adjustability permits the bracket to be used in any normal size recess. Likewise the bracket of this invention may be used in a recess within a structural wall of any normally encountered thickness. The bracket of the present invention is also simply installed, since the longitudinal dimension of the bracket may be readily reduced for passage through the opening in the wall and then adjusted to provide the exact longitudinal length corresponding to the size of the recess.

Accordingly, it is an object of this invention to provide a novel mounting bracket for use in a recess within a structural wall.

Another object of this invention is to provide a mounting bracket which is fully adjustable as to depth, width and thickness of the structural wall.

These and other objects of this invention will become apparent from the detatiled description which follows.

This invention comprises certain novel combinations and arrangements of parts as will hereinafter be more fully set forth and claimed. In the accompanying drawings, there is illustrated a mounting bracket in which the parts are combined and arranged according to one mode I have thus far devised for the practical application of my invention. Such changes and alterations as are necessary for other adaptations of the mounting bracket may be made in the exemplified structure, within the scope of the claims without departing from the principles of my invention.

Turning to the drawings, FIGURE 1 is a front elevation of the mounting bracket of my invention in place on a wall.

FIGURE 2 is a section along line 2—2 of FIGURE 1.

FIGURE 3 is a section on line 3—3 in FIGURE 1.

FIGURE 4 is a partial side elevation of the mounting bracket in place on a wall.

As is shown in the drawings, the mounting bracket is normally used in a recess in a structural wall 10. At the sides of the bracket, an outer side wall 11 terminates in an outwardly extending flange 12. A movable wall 13 carrying an inwardly extending flange 14 slides on the outer wall 11 and terminates in an outwardly turning flange 15. The structural wall 10 will be grasped between flanges 12 and 15 and held there by tightening screw 16 which functions by engaging in and extending between the female threads in a threaded hole 14' in flange 14 and a threaded opening 17 in the shoulder-like, J-shaped projection 18. This projection is stamped from and integral with outer wall 11 and end wall 19. The walls 11 and 13 are thus adjustable. The entire bracket is adjustable longitudinally by virtue of the fact that outer end wall 19 slides over inner end wall 20, the two being affixed by a nut 21 and bolt 22 operating in slot 23 in wall 19 and slot 23' in wall 20. Metal screw holes 24 and 25 in movable wall 13 are provided for receiving retaining screws for any device such as a soap dish or paper holder or the like which may be desired to be mounted in this bracket. The outer wall 11 is provided with a slot 26 to permit the passage of such retaining screws therethrough.

In the preferred embodiment depicted in the drawings, it will be noted that each rear wall portion with its extending outer side wall is identical. Likewise, both of the movable walls are the same. Accordingly, in the manufacture of the mounting bracket of this invention each right-hand part is identical to and interchangeable with each corresponding left-hand part, thereby resulting in the most economical use of the metal stamping and cutting equipment.

It will also be noted that the position and number of screw holes 24 and 25 may be varied as desired to receive a great variety of fixtures of various sizes and shapes. Naturally, for any specific fixture it is necessary to determine the proper position of the screw holes within the mounting bracket in order that the fixture when mounted will be in proper alignment and flush with the structural wall.

In installing the mounting bracket of this invention within the recess of a structural wall the workman will first assemble the device, with screws 16 being adjusted so that the distance between flanges 12 and 15 is somewhat greater than the structural wall thickness, and nut 21 and bolt 22 adjusted so that the longitudinal length of the bracket is somewhat less than the size of the recess into which it is to be placed. Thereafter, the workman simply places the bracket in the recess, manually slides the two portions of the rear wall apart until the correct longitudinal length is obtained, and then secures bolt 22 within nut 21. The movable flange 15 may then be adjusted with respect to flange 12 in order that the structural wall may be grasped between the two flanges at each side of the bracket. The correct position of the flanges may then be secured by tightening screw 16. The device is then ready to receive the soap dish, paper holder or other fixture by simply inserting screws through openings at each side of the fixture and then securing the screws in the holes 24 and 25.

Having fully described the invention it is intended that it be limited only by the lawful scope of the appended claims.

I claim:

1. A mounting bracket for mounting a fixture in a recess comprising: a rear wall, from the opposite ends of which extend side walls, each of said side walls terminating in an outwardly extending flange and having a fastener-receiving means affixed to its inner side, on each said side wall, a slidable inner wall, the inner extremity of which terminates in an inwardly extending flange having an aperture therein adapted to permit the passage of a fastening means, and the outer extremity of said inner wall extending beyond the said flange of the side wall and terminating in an outwardly extending flange, the slidable inner walls being adjustably connected to said side walls by fastener means passing through the aperture in said inwardly extending flange and being received in said fastener-receiving means, whereby the distance between the outwardly extending flanges on said side and inner walls may be adjusted to grasp a structural wall of any thickness.

2. A mounting bracket for mounting a fixture in a recess comprising: a rear wall, from the opposite ends of which extend side walls, each of said side walls terminating in an outwardly extending flange and having a fixed shoulder-like projection on its inner side, said projections having apertures therein adapted to receive a fastening means, on each said side wall a slidable inner wall, the inner extremity of which terminates in an inwardly extending flange having an aperture therein adapted to permit the passage of said fastening means, and the outer extremity of said inner wall extending beyond the said flange of the side wall and terminating in an outwardly extending flange, the slidable inner walls being adjustably connected to said side walls by fastening means passing through the apertures in said inwardly extending flange and said shoulder-like projection, whereby the distance between the outwardly extending flanges on said side and inner walls may be adjusted to grasp a structural wall of any thickness.

3. A mounting bracket for mounting a fixture in a recess comprising: a rear wall, from the opposite ends of which extend side walls, each of said side walls terminating in an outwardly extending flange and having a fixed shoulder-like projection on its inner side, the projections having threaded apertures therein adapted to receive threaded fastening means, on each said side wall a slidable inner wall, the inner extremity of which terminates in an inwardly extending flange having a threaded aperture therein adapted to permit the passage of a threaded fastening means, and the outer extremity of said inner wall extending beyond the said flange of the side wall and terminating in an outwardly extending flange, the slidable inner walls being adjustably connected to said side walls by threaded fastening means passing through the threaded aperture in said inwardly extending flange and said shoulder-like projection, whereby the distance between the outwardly extending flanges on said side and inner walls may be adjusted to grasp a structural wall of any thickness.

4. A mounting bracket for mounting a fixture in a recess comprising: a rear wall, from the opposite ends of which extend side walls, each of said side walls terminating in an outwardly extending flange and having a fixed shoulder-like projection on its inner side, the projection having threaded apertures therein adapted to receive screws, on each said side wall a slidable inner wall, the inner extremity of which terminates in an inwardly extending flange having a threaded aperture therein adapted to permit the passage of a said screw, and the outer extremity of said inner wall extending beyond the said flange of the side wall and terminating in an outwardly extending flange, the slidable inner walls being adjustably connected to said side walls by screws passing through the apertures in said inwardly extending flange and said shoulder-like projection, whereby the distance between the outwardly extending flanges on said side and inner walls may be adjusted to grasp a structural wall of any thickness.

5. A mounting bracket for mounting a fixture in a recess comprising: a longitudinally adjustable rear wall from the opposite ends of which extend side walls, each of said side walls terminating in an outwardly extending flange and having a fastener receiving means affixed to its inner side, on each said side wall a slidable inner wall, the inner extremity of which treminates in an inwardly extending flange having an aperture therein adapted to permit the passage of a fastener means, and the outer extremity of said inner wall extending beyond said flange of the side wall and terminating in an outwardly extending flange, the slidable inner walls being adjustably connected to said side walls by fastener means passing through the aperture in said inwardly extending flange and being received in said fastener receiving means, whereby the distance between the outwardly extending flanges on said side and inner walls may be adjusted to grasp a structural wall of any thickness.

6. A mounting bracket for mounting a fixture in a recess comprising: a longitudinally adjustable rear wall from the opposite ends of which extend side walls, each of said side walls terminating in an outwardly extending flange and having a fixed shoulder-like projection on its inner side, the projections having apertures therein adapted to receive fastening means, on each said side wall a slidable inner wall, the inner extremity of which terminates in an inwardly extending flange having an aperture therein adapted to permit the passage of said fastening means, and the outer extremity of said inner wall extending beyond said flange of the side wall and terminating in an outwardly extending flange, the slidable inner walls being adjustably connected to said side walls by fastener means passing through the aperture in said inwardly extending flange and said shoulder-like projection, whereby the distance between the outwardly extending flange on said side and inner walls may be adjusted to grasp a structural wall of any thickness.

7. A mounting bracket for mounting a fixture in a recess comprising: a longitudinally adjustable rear wall from the opposite ends of which extend side walls, each of said side walls terminating in an outwardly extending flange and having a fixed shoulder-like projection on its inner side, the projections having threaded apertures therein adapted to receive screws, on each said side wall a slidable inner wall the inner extremity of which terminates in an inwardly extending flange having a threaded aperture therein adapted to permit the passage of a screw, and the outer extremity of said inner wall extending beyond the said flange of the side wall and terminating in an outwardly extending flange, the slidable inner walls being adjustably connected to said side walls by screws passing through the threaded apertures in said inwardly extending flange and said shoulder-like projection, whereby the distance between the outwardly extending flanges on said side and inner walls may be adjusted to grasp a structural wall of any thickness.

8. A mounting bracket for mounting a fixture in a recess comprising: a longitudinally adjustable rear wall having two portions which slide over one another, said portions being affixed by a fastening means operating in slots within said portions, extending from the opposite ends of said rear wall, side walls, each of said side walls terminating in an outwardly extending flange and having a fixed shoulder-like projection on its inner side, the projections having apertures therein adapted to receive fastening means, on each side wall, a slidable inner wall, the inner extremity of which terminates in an inwardly extending flange having an aperture therein adapted to permit the passage of said fastening means, and the outer extremity of said inner wall extending beyond the said flange of the side wall and terminating in an outwardly extending flange, the slidable inner walls being adjustably connected to said side walls by a fastening means passing through the apertures in said inwardly extending flange and said shoulder-like projection, whereby the distance between the outwardly extending flanges on the said side and inner walls may be adjusted to grasp a structural wall of any thickness.

9. A mounting bracket for mounting a fixture in a recess comprising: a longitudinally adjustable rear wall and having two portions which slide over one another and have slots therein in which operate a nut and bolt, extending from the opposite ends of said rear wall, side walls, each of said side walls terminating in an outwardly extending flange and having a fixed shoulder-like projection on its inner side, the projections having threaded apertures therein adapted to receive screws, on each said side wall, a slidable inner wall, the inner extremity of which terminates in an inwardly extending flange, having a threaded aperture therein adapted to permit the passage of screws, and the outer extremity of said inner wall extending beyond the said flange of the side wall and terminating in an outwardly extending flange, the slidable inner walls being adjustably connected to said side walls by a screw passing through the aperture in said inwardly extending flange and said shoulder-like projection, whereby the distance between the outwardly extending flanges on said side and inner walls may be adjusted to grasp the structural wall of any thickness.

References Cited by the Examiner

UNITED STATES PATENTS

| | | | |
|---|---|---|---|
| 1,213,865 | 1/1917 | Gunn | 248—343 |
| 2,869,908 | 1/1959 | Ford | 292—1 |
| 2,954,959 | 10/1960 | Kaufman et al. | 248—343 |

CLAUDE A. LE ROY, *Primary Examiner.*

J. F. FOSS, *Assistant Examiner.*